(12) United States Patent
Thoreson et al.

(10) Patent No.: US 9,126,482 B2
(45) Date of Patent: Sep. 8, 2015

(54) ATTITUDE DISPLAY SYSTEM FOR REMOTELY OPERATED MACHINE

(71) Applicant: Caterpillar Inc., Peoria, IL (US)

(72) Inventors: Joseph A. Thoreson, Dunlap, IL (US); Jeffrey A. Brush, Dunlap, IL (US); Seth J. Redenbo, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 68 days.

(21) Appl. No.: 13/949,513

(22) Filed: Jul. 24, 2013

(65) Prior Publication Data
US 2015/0029017 A1    Jan. 29, 2015

(51) Int. Cl.
*G09F 9/00* (2006.01)
*B60K 35/00* (2006.01)
*G08B 5/36* (2006.01)

(52) U.S. Cl.
CPC .. *B60K 35/00* (2013.01); *G08B 5/36* (2013.01)

(58) Field of Classification Search
CPC .... G06Q 10/10; H04L 12/1818; H04L 51/32; H04L 67/02; H04L 67/306; B60K 35/00; G06F 3/011; G08B 5/36; A61B 1/00045; A61B 1/042; A63F 2300/1093; A63F 2300/201; A63F 2300/204; A63F 2300/6045

USPC ......... 340/461, 870.02, 967, 953, 975, 568.1, 340/679–680, 691.6
See application file for complete search history.

(56) References Cited

U.S. PATENT DOCUMENTS

| | | | |
|---|---|---|---|
| 3,846,781 A | 11/1974 | Smith | |
| 6,112,145 A * | 8/2000 | Zachman | 701/50 |
| 6,166,802 A * | 12/2000 | Kodaira et al. | 356/4.08 |
| 6,736,216 B2 * | 5/2004 | Savard et al. | 172/1 |
| 6,879,910 B2 * | 4/2005 | Shike et al. | 701/454 |
| 7,857,071 B1 * | 12/2010 | McCain et al. | 172/4.5 |
| 8,205,164 B2 | 6/2012 | Kim et al. | |
| 2006/0212182 A1 | 9/2006 | Shaw | |
| 2013/0066527 A1 | 3/2013 | Mizuochi et al. | |

* cited by examiner

*Primary Examiner* — Daniel Previl

(57) ABSTRACT

Attitude display system for remotely operated machine is provided. The attitude display system includes a pitch display and a roll display. The pitch display includes a fixed pitch reference scale and a pitch indicator. The pitch indicator can be configured to move relative to the fixed pitch reference scale to indicate a pitch of the remotely operated machine. The roll display includes a roll reference element and a roll indicator configured to pivot about a reference point to indicate a roll of the remotely operated machine. Further, the pitch display and the roll display include a pitch text field and a roll text filed to display a numeric value of the pitch and roll respectively. Also, the pitch indicator and the roll indicator can be configured to change to a first color and a second color based on a degree of movement or pivot.

3 Claims, 5 Drawing Sheets

ATTITUDE DISPLAY SYSTEM FOR REMOTELY OPERATED MACHINE

TECHNICAL FIELD

The present disclosure relates generally to a display system for machines. More specifically, the present disclosure relates to an attitude display system for remotely operated machines.

BACKGROUND

In recent years, companies have invested significantly in the research and development of technology for remotely controlling construction machines such as hydraulic excavators, bulldozers or dump trucks, and track-type tractors. Particularly in working sites that are dangerous for workers to enter, such as a site for restoration against natural calamities or the construction of a dam, a quarry, or an iron mill, machines are controlled through a remote operating station. The machine can be employed on an actual worksite, while the remote operating station can be positioned indoors. Machine operators interface with machines through a control panel in the remote operating station. The operator continuously monitors the machine on a display device of the remote operating station. The display device is used to indicate the state of the machine. In other words, the display device indicates the machine's movement, such as speed or direction. However, in various work areas, machines usually work on grades and/or slopes. In such a scenario, information regarding the orientation or attitude of the machine is important for the operator to control the machine.

It can be imperative for the operator to know the attitude parameters such as pitch and roll of the machine. Pitch is the angle of the wheel base or track frame of machine while moving up/down on a slope. In other words, if a machine is moving up/down an incline, it has a certain pitch with respect to horizontal. On the other hand, if a machine is banked or tilted towards left of right, it is said to have a certain roll with respect to horizontal. In other words, pivotal movement about the transverse axis is called pitch, and rotation about the longitudinal axis of the machine is termed as roll. The operator can use information on both pitch and roll to control the machine. If the pitch is beyond a threshold level, the machine engine can stall or the machine can topple. On the other hand, if the roll exceeds a threshold value, the machine can capsize and tumble to the side.

Presently, there are several ways to indicate machine attitude. The indicating devices have been commonly mounted on the machine. For example, U.S. Pat. No. 3,846,781 discloses an indicating device having a pendulum and a pointer arrangement. The pendulum and the point arrangement are attached to the machine. The pendulum moves in the longitudinal direction and the pointer is configured to move in a transverse direction to indicate the pitch and roll of the machine, respectively. The disclosed arrangement is a mechanical assembly that indicates the sideward slope and the up and down slope of the machine. Another existing indicating device to indicate the pitch and roll can be found in the domain of aircraft. For example, 2006 US publication 0212182 describes a pitch and roll indicator display, where the movement of the horizon relative to a fixed aircraft symbol indicates the pitch and roll of the aircraft.

There is a need for indicating attitude of the machine at the remote operating station that is used to operate a machine from a remote location.

SUMMARY OF THE DISCLOSURE

One of the aspect of the present disclosure if directed an attitude display system for a remotely operated machine. The attitude display system for a remotely operated machine includes a pitch display having a fixed pitch reference scale and a pitch indicator. The pitch indicator can be configured to move relative to the fixed pitch reference scale to indicate a pitch of the remotely operated machine. Further, the pitch display includes a pitch text field to display a numerical value of the pitch.

Further, the attitude display system includes, a roll display having a roll reference element. The roll indicator can be configured to pivot about a reference point to indicate a roll of the remotely operated machine. Further, the roll display includes a roll text field to display a numerical value of the roll. Moreover, at least one of the pitch indicator and the roll indicator is configured to change color based on a degree of movement or pivot relative to a predefined threshold value to provide warning to a user of the system. Furthermore, the fixed pitch reference and the roll reference are configured to maintain their relative position to one another regardless of the pitch and roll of the remotely operated machine.

In another embodiment, the attitude display system for a remotely operated machine is provided. The attitude display system includes a pitch display having a fixed pitch reference scale that is vertically oriented. Further, the pitch display includes a horizontally oriented pitch indicator. The pitch indicator can be configured to vertically move relative to the fixed pitch reference scale to indicate a pitch of the remotely operated machine. Furthermore, the pitch display includes a pitch text field to display a numerical value of the pitch The attitude display system further includes a roll display having a roll reference element and a roll indicator. The roll indicator can be configured to pivot about a reference point to indicate a roll of the remotely operated machine. The roll display also includes a roll text field to display a numerical value of the roll. Further, at least one of the pitch indicator and the roll indicator is configured to change to a first color based on a degree of movement or pivot relative to a first predefined threshold value.

Furthermore, at least one of the pitch indicator and the roll indicator can be configured to change to a second color based on the degree of movement or pivot relative to a second greater predefined threshold value to provide different warnings to a user of the system. Moreover, the fixed pitch reference and the roll reference are configured to maintain their relative position to one another regardless of the pitch and roll of the remotely operated machine.

In yet another embodiment, an attitude display system for a remotely operated machine is provided. The display system includes a controller configured to receive signals indicating a pitch and a roll of a remotely operated machine. The controller can be configured to communicate signals to a pitch display and a roll display. The pitch display can include a fixed pitch reference scale that is vertically oriented and a horizontally oriented pitch indicator. The pitch indicator is configured to vertically move relative to the fixed pitch reference scale to indicate the pitch of the remotely operated machine. Further, the pitch display includes a pitch text field to display a numerical value of the pitch.

Further, the attitude display includes the roll display. The roll display includes a roll reference element and a roll indicator. The roll indicator is configured to pivot about a reference point to indicate the roll of the remotely operated machine. Further the roll display includes a roll text field to display a numerical value of the roll. Furthermore, at least one of the pitch indicator and the roll indicator is configured to change color based on the degree of movement or pivot relative to a predefined threshold value to provide warning to a user of the system. Moreover, the fixed pitch reference and the roll reference are configured to maintain their relative position to one another regardless of the pitch and the roll of the remotely operated machine. Furthermore, the pitch indicator and the roll indicator are configured to be in an overlaying configuration when within certain ranges of the pitch and the roll of the remotely operated machine, the pitch indicator and the roll indicator have different configurations.

BRIEF DESCRIPTION OF THE DRAWINGS

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present disclosure.

Skilled artisans will appreciate that elements in the figures are illustrated for simplicity and clarity and have not necessarily been drawn to scale. For example, the dimensions of some of the elements in the figures can be exaggerated, relative to other elements, to help in improving an understanding of the embodiments of the present disclosure.

DETAILED DESCRIPTION

Before describing the embodiments in detail in accordance with the present disclosure, it should be observed that these embodiments reside primarily in the display system. Accordingly, the system components have been represented to show only those specific details that are pertinent for an understanding of the embodiments of the present disclosure, and not the details that will be apparent to those with an ordinary skill in the art.

In this document, the terms "comprises," "comprising," or any other variation thereof, are intended to cover a non-exclusive inclusion, such that a process, method, article or apparatus that comprises a list of elements does not include only those elements but can include other elements not expressly listed or inherent to such a process, method, article or apparatus. An element proceeded by "comprises . . . a" does not, without more constraints, preclude the existence of additional identical elements in the process, method, article or apparatus that comprises the element. The term "another," as used in this document, is defined as at least a second or more. The term "includes", as used herein, is defined as comprising. Further, the terms "coupling", "coupled", "attaching" or "attached" or any other variation therefore are used interchangeably in this document and refers to same meaning and scope.

Figure 1:
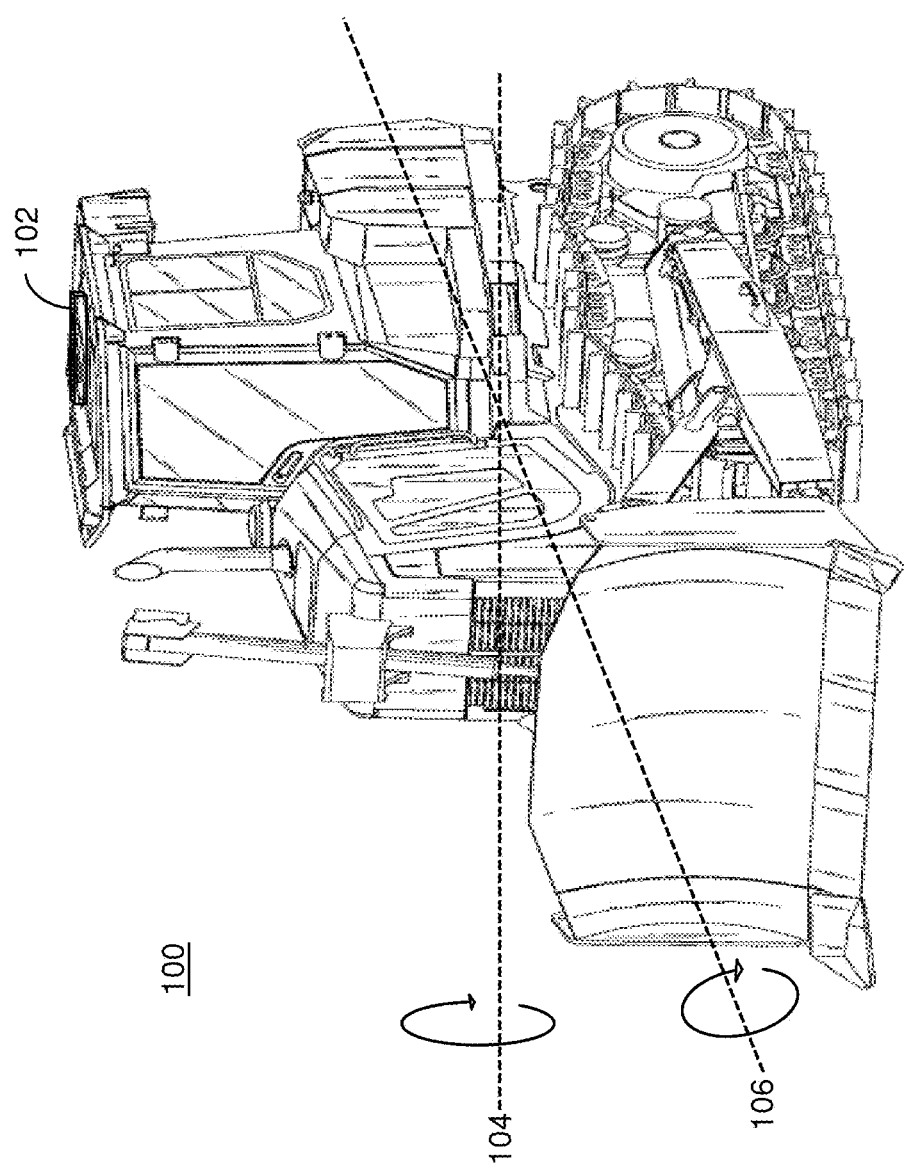
FIG. 1 illustrates a perspective view of a remotely operated machine.

FIG. 1 illustrates a perspective view of a remotely operated machine 100 in accordance with an embodiment of the present disclosure. The machine 100 is shown to include a control unit 102, a transverse axis 104, and a longitudinal axis 106.

The remotely operated machine 100 can refer to machines such as, but not limited to, heavy vehicles, backhoe loaders, skid steer loaders, paving machines, wheel loaders, material loaders, pipe layers, cranes, motor graders, track-type tractors, landfill compactors, excavators, articulated trucks, compactors, agricultural machines, and forest machines. In an embodiment, the machine 100 is a track-type tractor. The machine 100 is designed to work in various environments such as construction sites, quarries, agricultural sites, and similar environments.

In general, the machine 100 is operated by an operator working within a cab of the machine 100. However, in extreme environments such as hazardous waste handling, restoration work against natural calamities, a site for the construction of a dam, a quarry, or an iron mill, the machine 100 is remotely operated. The machine 100 is controlled by an operator working from a remote operating station (see FIG. 2). In this embodiment, the machine 100 may communicate with the remote operating station through the control unit 102. The control unit 102 can include a transmitter and a receiver such as, e.g., in a transceiver (not shown), and a processing unit (not shown). The transceiver and the processing unit can be in electrical communication with one another. The transceiver can be configured to receive control signals from the remote operating station and to send control signals to the remote operating station. The processing unit is operative for processing the received control signals and operative for processing the control signals to be sent. Further, the processing unit is configured to generate control commands corresponding to the received control signals.

Further, the control unit 102 can include a set of inclination sensors (not shown), for example, inclinometers or sensing elements associated with conventional pitch and roll inclination electronics. In an embodiment, the electronics can include, for example, electrodes disposed within a glass vial and submerged in an electrically conductive fluid, such that as machine inclination changes, submersion depths of the electrodes also change, and electrical resistances of paths between electrodes can change accordingly. As such, attitude (the pitch and roll) of machine 100 can be defined in terms of the measured resistances. It is to be appreciated that other pitch and roll and/or inclination sensors known in the art can be used alternatively or additionally. In an embodiment, a (Global Positioning System) GPS, a satellite or radio based positioning, or an optical sensor system can be used to determine pitch or roll of the machine 100.

The set of inclination sensors measure the inclination or attitude of the machine 100 relative to intersecting axes: transverse axis 104 and longitudinal axis 106. During the course of work, the machine 100 can be required to work on sloped terrain and graded terrain. While working on sloped terrain and graded terrain, the orientation or attitude of machine 100 changes. In an embodiment, the machine 100, while moving up or down a slope, can be angularly inclined relative to the transverse axis 104. In an embodiment, the transverse axis 104 is parallel to the ground (i.e., zero degrees of inclination) and is perpendicular to the direction of motion of machine 100. Inclination about the transverse axis 104 is referred to as pitch of the machine 100. Further, the machine 100 can also pivot relative to the longitudinal axis 106. In an embodiment, the longitudinal axis 106 can be parallel to the ground (i.e., zero degrees of inclination) and the direction of motion of machine. Inclination of machine relative to the longitudinal axis 106 is referred to as roll. In other words, up and down rotation about transverse axis 104 can be referred to as pitch, whereas sideways tilt or banking of the machine 100 about the longitudinal axis 106 can be referred to as roll. The measurement of pitch and roll of the machine at any given point of time referred to as attitude of the machine 100.

The set of inclination sensors measures the attitude of the machine 100. For example, the sensors can measure the pitch and the roll of the machine 100 relative to the transverse and longitudinal axes 104, 106, respectively. The measured pitch and roll can be communicated to the processing unit of the control unit 102. Further, the processing unit can communicate the measured attitude (the pitch and the roll) to the remote operating station through the transceiver. The communication between the machine 100 and the remote operating station is further described in subsequent figures.

Figure 2:
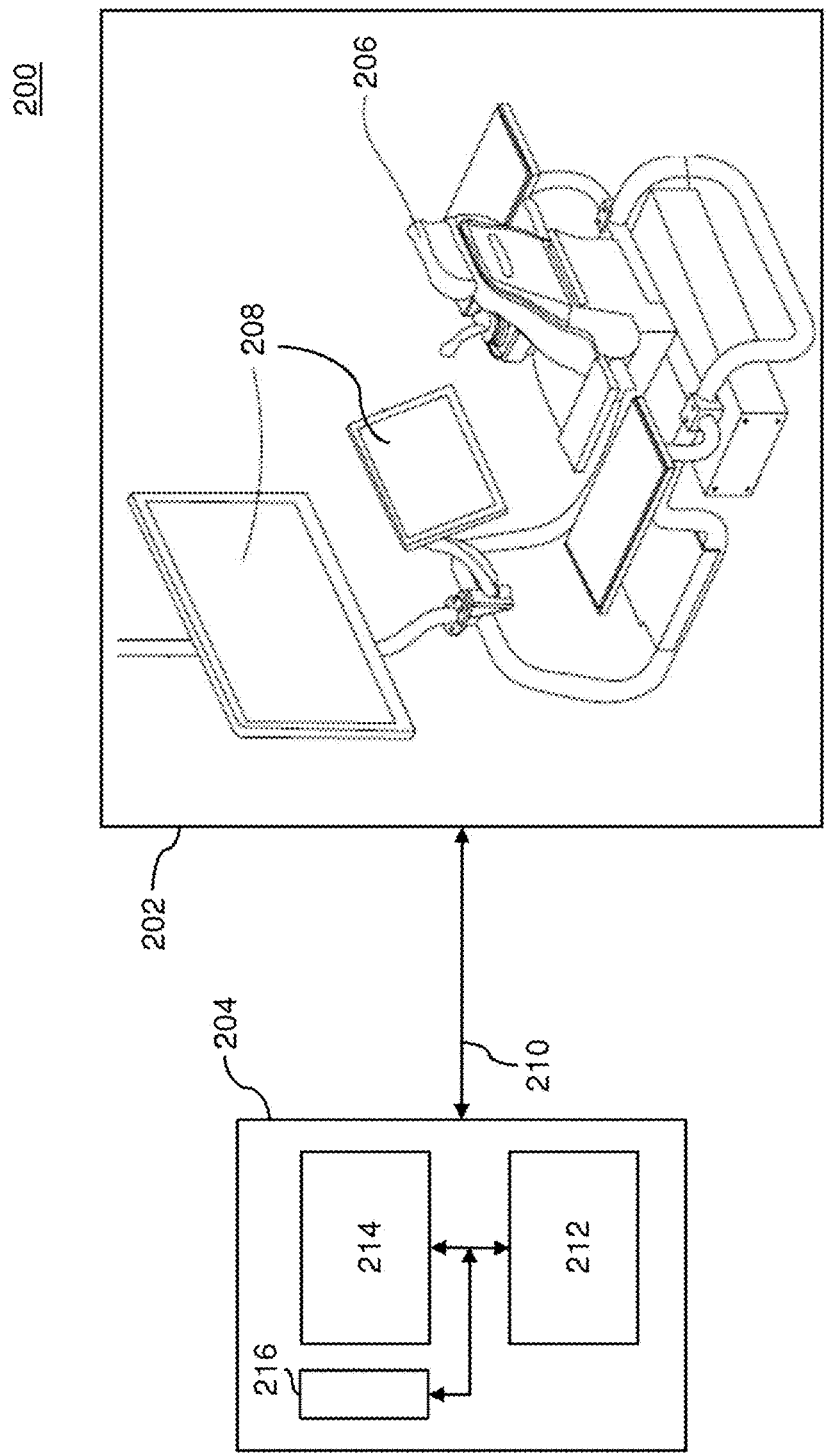
FIG. 2 illustrates an attitude display system according to the concepts of the present disclosure.

FIG. 2 illustrates an attitude display system 200. The attitude display system 200 can include a remote operating station 202 and a controller 204. In an embodiment, the remote operating station 202 can be used to control remotely operating machines such as, but not limited to, backhoe loaders, skid steer loaders, wheel loaders, material loaders, motor graders, track-type tractors, landfill compactors, excavators, articulated trucks, and compactors. In this embodiment, the remote operating station 202 can be used to provide an environment of a real-time operation of the machine 100. In an alternative embodiment, the remote operating station 202 can be used to impart training to operators. In an alternative embodiment, the remote operating station 202 can be a handheld controller.

The remote operating station 202 includes a seat 206, and one or more user display devices 208. To control the remotely operated machine, such as machine 100, the operator can be seated on the seat 206. In an embodiment, the one or more user display devices 208 can be a display panel configured to render a camera feed of an actual worksite. In other words, the one or more user display device 208 can display a real-time video captured by one or more cameras in the worksite. In one embodiment, the user display device 208 can be a display panel configured to display visual information in the form of pictures, video feeds, texts, and graphics to an operator. Further, the one or more user display device 208 can display real-time machine characteristics such as speed, engine temperature, and position information. In an embodiment, attitude of the machine 100 such as the pitch and roll of the machine 100 are displayed on the one or more user display device 208.

However, in alternative embodiments, the one or more user display device 208 can be employed as a control device or an input device, such as but not limited to touch-based user interfaces that are configured to receive input signals from an operator and control operation of the machine 100.

The remote operating station 202 is in electrical communication with the controller 204 through a connection 210. In an embodiment, the controller 204 can be located within the remote operating station 202. In another embodiment, the controller 204 can be located at a different location, away from the remote operating station 202. The controller 204 is configured to control the functions of the remote operating station 202, and display information on the one or more user display device 208. The controller 204 includes a transceiver 212, a processing unit 214, in electrical communication with one another. The controller 204 is configured to receive signals indicating the pitch and roll of the remotely operated machine 100. In an embodiment, the controller 204 includes the transceiver 212. The transceiver 212 enables communication with the remotely operated machine 100. Further, the controller 204 includes the processing unit 214. The processing unit 214 is configured to receive the signals indicating the pitch and the roll from the transceiver 212. Further, the processing unit 214 communicates the signals to the one or more display 208. Furthermore, the processing unit 214 can be configured to receive input commands from the remote operating station 202. The input commands are processed and communicated to the remotely operated machine 100 through the transceiver 214. For example, the transceiver 212 can be configured to receive signals indicative of the pitch and roll from the machine 100. The signals of pitch and roll from the transceiver 212 can be communicated to the processing unit 212, where the signals are processed into display signals and are communicated to the one or more user display device 208 of the remote operating station 202. In an embodiment, the transceiver 212 can be in electrical communication with the transceiver of the machine 100 through a wireless communication channel, such as, e.g., a wireless communication channel, a radio communication channel, a wired channel, and the like. Furthermore the controller 204 can include a memory unit 216, can be a storage device. In an embodiment, the memory unit 216 can be, but limited to, a hard disk, a Random Access Memory (RAM), a Read Only Memory (ROM), a flash drive, magnetic tape and the like. In an embodiment, the memory unit 216 can be in electrical communication with the processing unit 214. The memory unit can be configured to store a predefined threshold value. In an embodiment, the predefined threshold value can be numeric value of the pitch and roll.

Figure 3A:
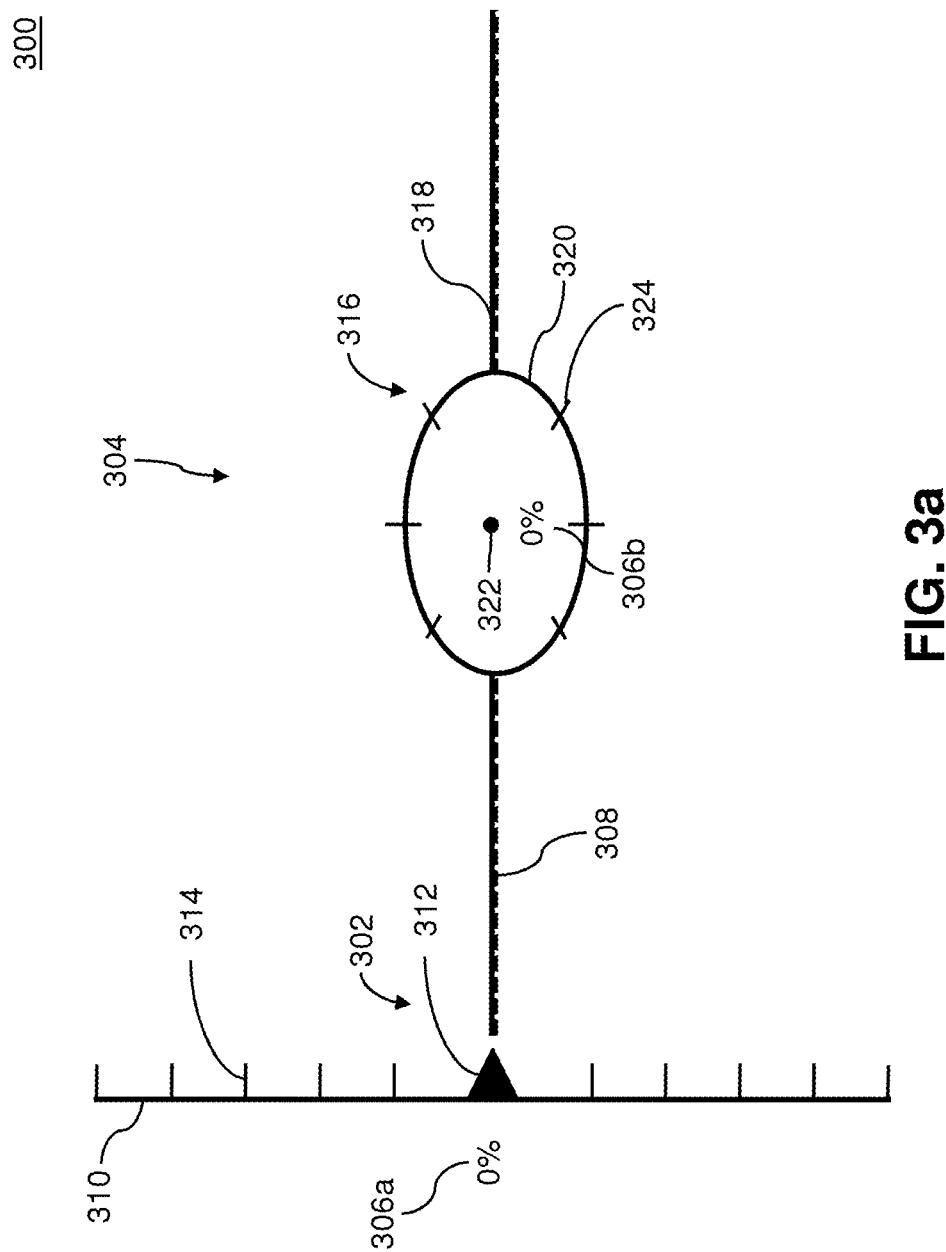
FIG. 3a illustrate an embodiment of user display device of the attitude display system.
Figure 3B:
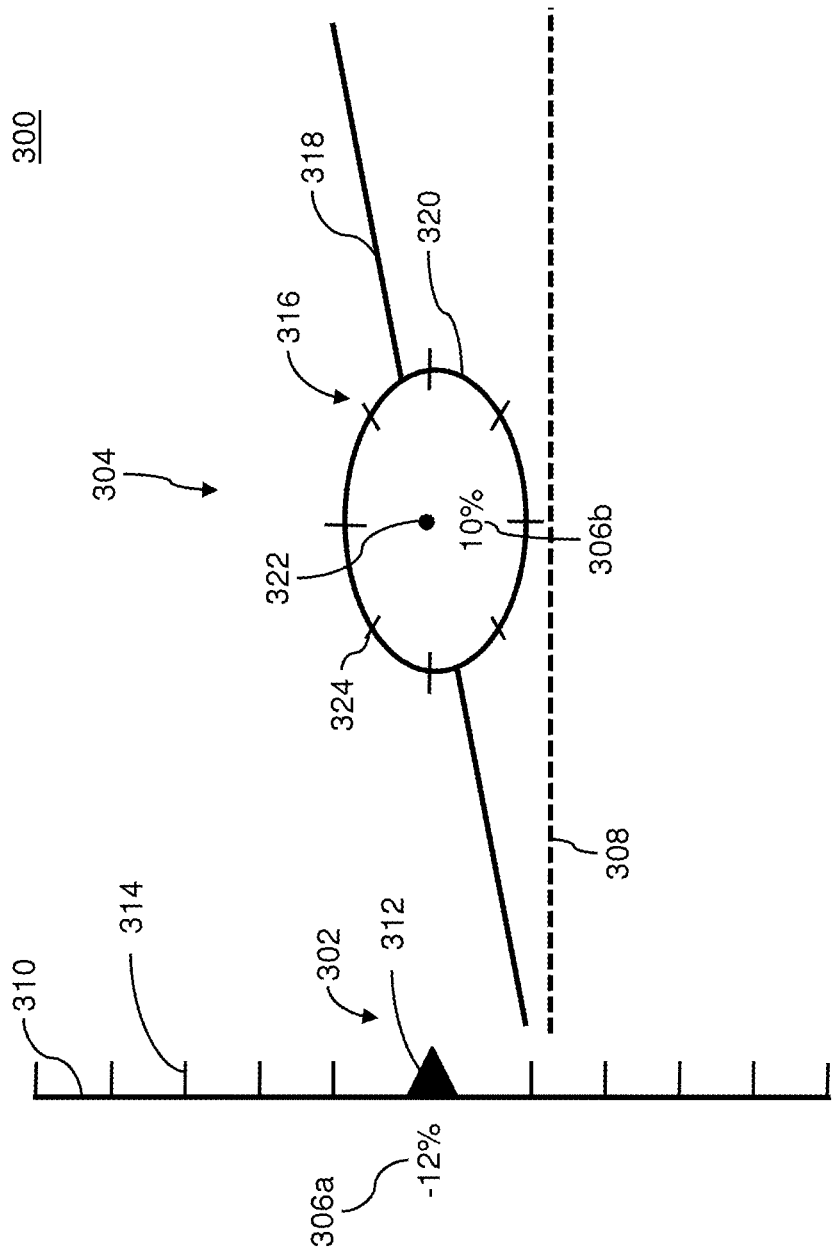
FIG. 3b illustrates an embodiment of the pitch display and the roll display.

FIGS. 3a and 3b illustrates an embodiment 300 of the one or more user display device 208 of the attitude display system 200. The one or more user display device 208 can display real-time machine characteristics, such as speed, engine temperature, and position information. In this embodiment, the one or more user display device 208 is configured to display a pitch display 302, a roll display 304, a pitch text field 306a and, a roll text field 306b.

In an embodiment, the pitch display 302 can includes a pitch indicator 308 and a fixed pitch reference scale 310. The pitch indicator 308 and the fixed pitch reference scale 310 can be displayed on the one or more user display device 208. In one embodiment, the pitch indicator 308 can be horizontally oriented. In one embodiment, the fixed pitch reference scale 310 can be vertically oriented. In other words, pitch indicator 308 can be a horizontal line and the fixed pitch reference scale 310 can be vertical straight line. In another embodiment, the pitch indicator 308 and/or the fixed pitch reference scale 310 can be a solid line or a dashed line. The pitch indicator 308 (shown as horizontal dashed line in figure) is configured to move relative to the fixed pitch reference scale 310 (shown as solid vertical line). The pitch indicator 308 can move vertically, upward or downward, relative to the fixed pitch reference scale 310. The position of the pitch indicator 308 relative to the pitch reference scale 310 can indicate current pitch of the remotely operated machine 100. In other words, the pitch indicator 308 is configured to move corresponding to any change in the pitch of the machine 100.

The fixed pitch reference scale 310 can be a ruled line. In one embodiment, the fixed pitch reference scale 310 has a reference node 312 at its center. Further, a set of increment nodes 314 can be equally spaced above and below the reference node 312. In an embodiment, each increment node 314 can indicate a percentage variation or change in value of the pitch of the machine 100 with respect to a predetermined pitch reference. In other words, the reference node 312 refers to 0 pitch (machine is horizontal on a level ground) and each of the increment nodes 314 indicate the percentage change in the pitch of the machine from zero to vertical. As shown in FIG. 3a, the position of the pitch indicator 308 (horizontal dashed line) is in alignment with the reference node 312. This position of the pitch indicator 308 indicates the current pitch (0 pitch). In other words, the machine 100 is currently in horizontal position.

In one embodiment, the reference node 312 and the increment nodes 314 can be configured to remain fixed relative to the movable pitch indicator 308 (horizontal dashed line). In another embodiment, the pitch indicator 308 can be positioned adjacent (to the right side) to the fixed pitch reference scale 310 and can be perpendicular to the fixed pitch reference scale 310. It can be understood that the relative position between the pitch indicator 308 and the fixed pitch reference scale 310 can include different combinations. For example, the pitch indicator 308 can be positioned adjacent (the left side) to the fixed pitch reference scale 310. The fixed pitch reference scale 310 can intersect any portion of the pitch indicator 308, such as, e.g., an intermediate portion.

Further, the one or more user display device 208 displays the roll display 304. The roll display 304 can include a roll reference 316 and a roll indicator 318. The roll reference 316 can include an enlarged element 320 which can be a geometric shape, such as an oval, circle, rectangle, etc. The enlarged element 320 can be positioned on the display about a reference point 322. In one embodiment, the enlarged element 320 can be an oval with solid lines, although it could be formed from other types of configurations, such as dashed lines or dots. In one embodiment, the roll indicator 318 can be displayed as a line extending outward from the perimeter of the enlarged element 320. The roll indicator 318 can be configured to be pivotable about the reference point 322. In an embodiment, the reference point 322 can be located inside the enlarged element 320. In another embodiment, the reference can be located outside the enlarged element 320. In one embodiment, the reference point 322 can be a fixed pivot point. In another embodiment, the reference point 322 can be a movable pivot point. Further, the roll reference 316 can have roll indicating nodes 324 extending radially from the perimeter of the enlarged element 320. In an embodiment, the roll indicating nodes 324 can indicate a reference scale for percentage variation or change in value of the roll of the machine 100 with respect to a predetermined roll reference.

Pivoting of the roll indicator 318 about the reference point 322 indicates the roll of the machine 100 with respect to the predetermined roll reference. For example, the reference point 322 can be maintained in linear alignment with the reference node 312, and with both being in a fixed position can form a horizontal reference (0%) for pitch and/or roll. The roll indicating nodes 324 extending laterally from the perimeter of the enlarged element 320 can indicate a zero reference relative to the rotating roll indicator 318. The roll indicating nodes 324 can be positioned to be maintaining linear relationship with the reference node 312. To this end, as shown in FIG. 3a, the roll indicator 318 is in a horizontal position to indicate zero roll of the machine 100.

In an embodiment, the fixed pitch reference 310 and the roll reference 316 are configured to maintain their relative position to one another regardless of the pitch and roll of the remotely operated machine. In other words, the fixed pitch reference 310 and the roll reference 316 are fixed relative to each other. It can be understood that, although the pitch display 302 and/or the roll display 304 can be moved at a suitable position on the one or more user display device 208, the fixed pitch reference 310 and the roll reference 316 are fixed relative to each other. In one embodiment, the fixed pitch reference 310 and the roll reference 316 can be adjusted to provide a convenient viewing angle to the user of the attitude display system 200. In one embodiment, user can zoom in/out of the pitch display 302 and/or the roll display 304.

Furthermore, the one or more user display device 208 is configured to display a set of text fields, for example the pitch text field 306a and the roll text field 306b. The pitch text field 306a can be associated with the pitch of the machine 100. Further, the roll text field 306b can be associated with the roll of the machine 100. In an embodiment, the pitch text field 306a is displayed along the fixed pitch reference scale 310, and the roll text field 306b is displayed along the roll reference 316.

The pitch text field 306a and the roll text field 306b can be configured to display a numeric value of the pitch and roll of the machine 100, respectively. The numeric value can be the pitch or roll value of the machine 100 with respect to a predetermined reference. In other words, the numeric value can be a percentage value of attitude of the machine 100 with respect to the predetermined reference. The pitch text field 306a and the roll text field 306b can be incorporated in the one or more user display 308 as a numerical value of the current relative pitch and roll, respectively, such as, in degrees or percentages (shown 0%). For example, the numeric value of pitch can be a percentage variation in the pitch with respect to level ground (zero pitch). On the other hand, the numeric value of roll can be percentage change in roll with respect to the horizontal (zero roll).

FIG. 3b illustrates an embodiment of the pitch display 302 and the roll display 304. The pitch display 302 can include the pitch indicator 308 and the fixed pitch reference scale 310. The pitch indicator 308 can be configured to display pitch of the machine 100. The position (as shown in figure) of the pitch indicator 308 (horizontal dashed line) is displayed below the reference node 312 of the fixed reference scale 310. In other words, the pitch indicator 308 is displayed to move vertically downward of the reference node 312. The displayed position of the pitch indicator 308 indicates the current pitch of the remotely operated machine 100. For example, the pitch indicator display 308 is shown to move downward, when the pitch of the machine 100 has changed with respect to horizontal. It can be understood that any change in the pitch of the machine 100 is displayed by the movement of the pitch indicator 308. Further, the pitch text field 306a is also shown along the pitch indicator 308. The pitch text field 306a can display the numeric value of the pitch of the machine 100. In this embodiment, the pitch text field 306a is configured to display the current numeric value of the pitch. For example, the pitch text field 306a can be incorporated to display a numerical value of the current pitch, such as, in degrees or percentages (shown negative 12%). It can be understood that a negative value of the pitch can refer to a downward incline and a positive value of pitch can refer to an upward incline.

Further, FIG. 3b illustrates an embodiment of the roll display 304. The roll display 304 includes the roll indicator 318. The pivoting movement of the roll indicator 318, relative to the roll reference 316 indicates the roll of the machine 100. In other words, the roll indicator 318 pivots relative to the roll reference 316 about the reference point 322. For example, as shown in the FIG. 3b, the roll indicator 318 can be displayed pivoting (banked) towards right with respect to horizontal. In other words, current pivoting movement of the machine 100 is shown by pivoting of the roll indicator 318. Further, the roll text field 306b is also shown along with the roll indicator 318. The roll text field 306b is configured to display the current numeric value of the roll. For example, the roll text field 306b can be configured to display a numeric value of positive 10 percent. The numeric value corresponds to the percentage roll of the machine 100, with respect to horizontal. In an embodiment, a negative numeric value of the roll can be displayed. It can be understood that a negative numeric value of roll can refer to pivoting movement towards left, and positive numeric value can refer to pivoting movement towards right.

In one embodiment, the pitch indicator 308 and the roll indicator 318 can completely or partially overlap each other. Further, it is to be noted that the numeric values of the pitch and the roll are calculated by an algorithm and/or a method known in the art. In an embodiment, the numeric values of the pitch and roll are calculated based on inclination measured by the pitch and roll sensors installed on the machine 100.

Figure 3C:
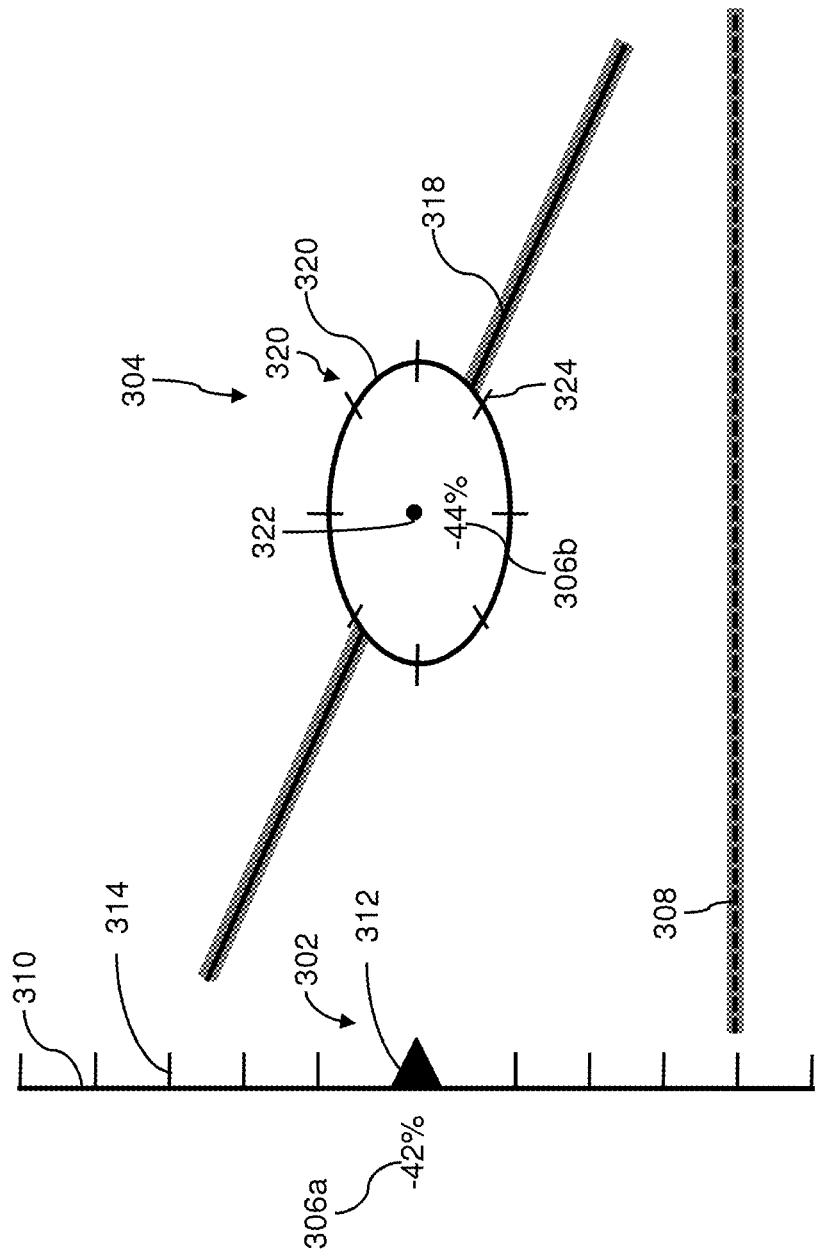
FIG. 3c illustrates another embodiment of the user display device of the attitude display system.

FIG. 3c illustrates an embodiment of the one or more user display device 208 of the attitude display system 200. The one or more user display device 208 is configured to display a visual alert for one or more elements of the display. In other words, at least one of the pitch indicator 308 and the roll indicator 318 is configured to change color based on a degree of movement or pivot relative to a predefined threshold value to provide warning to a user of the attitude display system 200. For example, the pitch indicator 302 and/or the roll indicator 304 can be indicated with changing colors to provide information of severity of the incline/roll with respect to a predefined threshold value.

In one embodiment, the pitch indicator 308 and the roll indicator 318 can be configured to change to a first color based on a degree of movement or pivot relative to a first predefined threshold value. Further, the pitch indicator 308 and the roll indicator 318 may be configured to change to a second color based on the degree of movement or pivot relative to a second greater predefined threshold value to provide different warnings to a user of the system 200. For example, the color of the pitch indicator 308 (dashed horizontal line) or the roll indicator 318 can change to yellow when the machine 100 achieves the numeric value of the pitch or roll of 40 percent with respect to the horizontal. In other words, the color of the pitch indicator 308 and/or the roll indicator 318 changes to yellow, when the numeric value of the pitch and/or roll, reaches the first predefined threshold value, say 40 percent. Thus, the machine 100 can be inclined and/or pivoted 40 percent with respect to horizontal. Further, the color of the pitch indicator 308 (dashed horizontal line) or the roll indicator 318 can change from yellow to red when the machine 100 achieves the numerical value of pitch above the second greater predefined threshold, say 45 percent. It can be understood that the pitch indicator 308 and/or the roll indicator 318 can configured to change color based on a predefined threshold value range. For example, the color of the pitch indicator 308 and/or the roll indicator 318 changes to yellow, when the pitch and/or roll value may be between a range of 40% to 45%. Further, the color of the pitch indicator 308 and/or the roll indicator 318 changes to red, when the pitch and/or roll value may be between a range of 46% to 55% Hence, one or more colors can be displayed to indicate severity or warning to the user of the attitude display system 200.

In an embodiment, one or more elements, other than the pitch indicator 308 and the roll indicator 318, of the pitch display 302 and/or the roll display 304 can be configured to change color relative to the degree of movement or pivot relative to pre defined threshold value, respectively.

In another embodiment, the visual alert can include highlighting the pitch indicator 308 and/or the roll indicator 318 based on a degree of movement or pivot relative to a predefined threshold value. In another embodiment, one or more background visual alert can be displayed to provide warning to a user of the system. In one embodiment, one or more colors can be displayed in a flashing manner to provide warning to a user of the system. In another embodiment, the frequency of flashing indicates a severity of warning to the user of the system.

INDUSTRIAL APPLICABILITY

The attitude display system 200 allows an operator to view the attitude of the remotely operated machine 100. The attitude display system 200 can be positioned in an indoor control room for operating one or more remotely operated machine 100.

As illustrated in various embodiments, as in FIG. 2, FIGS. 3a, 3b and 3c, the attitude display system 200 can include a remote operating station 202 and the one or more user display device 208. The operator working on the remote operating station 202 can view one or more user display device 208 to monitor the remotely operated machine 100. The remotely operated machine 100, for example, a track type tractor, can be operating at a mine site. The machine 100, while operating, can move up an inclined and also pivot sideways. In other words, the machine 100 can incline about the longitudinal axis 106 and pivot about the transverse axis 104. It can be understood that the machine 100 can have a certain value of pitch and roll. The values of the pitch and roll of the machine 100 can be determined by the set of inclination sensors. For example, the pitch and roll sensors installed on the machine 100. Further, the value of the pitch and roll can be sent to the remote operating station 202 through the control unit 102 of the machine 100. Thereafter, the value of pitch and the roll is received by the remote operating station 202 through the controller 204. The controller 204 can include one or more receiver, for example the transceiver 212. The transceiver 212 receives the pitch and rolls value and further provides this information to the processing unit 214 of the controller 204. The value of the pitch and roll are processed by the processing unit 214, and thereafter sent to the one or more display device 208. Further, the one or more display can be configured to display pitch and roll of the machine 100.

The one or more display 208 of the attitude display system 200 display can include the pitch display 302 and the roll display 304. The pitch display 302 includes the pitch indicator 308 and the fixed pitch reference scale 310. The pitch indicator 308 can move relative to the fixed pitch reference scale 310 to indicate the pitch of the remotely operated machine 100. For example, the pitch indicator 308 can move vertically upward/downward relative to the fixed reference scale 310, when the remotely operated machine 100 in moving up/down an incline, respectively. Further, the pitch text field 306a is also displayed along the pitch display 302. The pitch indicator field 306a displays the numeric value of the pitch of the machine 100. In other words, the pitch indicator 308 will slide downward relative to the fixed pitch reference scale 310 and the pitch text field 306a will display a numeric value of negative 12%, when the machine 100 is moving down a grade which is 12% of the horizontal. Hence, the user of the system, will be displayed a downward movement of the pitch indicator 308 and the text filed 306a can display the numeric value of the movement.

The roll display, 304 includes a roll indicator 318 and the roll reference 316. The roll indicator 318 can display the pivoting of the roll indicator 318 relative to the roll reference 316, when the machine 100 rolls. The roll indicator 318 can pivot about the reference point 322. A roll text filed 306b is also displayed along with the roll display 304. The roll display field 306b can display the numeric value of the roll. Hence, any sideways tilt or banking, pivot movement (roll) of the machine 100 can be displayed to the user of the machine 100, by the movement of the roll indicator 318 relative to the roll reference scale 316.

Furthermore, the pitch indicator 308 and/or the roll indicator 318 can be configured to change to a first color based on a degree of movement or pivot relative to a first predefined threshold value. In other words, color of the pitch indicator 308 changes to a first color; say yellow, when the machine 100 moves up or down an incline with grade that is within the first predefined threshold value of 40% to 45%. Similarly, the color of roll indicator is turned yellow, when the machine 100 is banked within the first predefined threshold value of roll of 40% to 45%. Further, if the roll or pitch of the machine 100 increases to a second greater predefined threshold value, say 46% or beyond, the color of the pitch indicator 308 and/or the roll indicator 318 can change to a second color, say red. For example, the machine 100 can operate on a grade with 52% upward inclined and pivot at an angle that is 42% to right. The color of the pitch indicator can be changed to red and the color of the roll indicator 318 can be changed to yellow. Hence, the color of the pitch indicator 308 and/or the roll indicator 318 is based on the degree of movement or pivot relative to the first predefined threshold value and the second greater predefined threshold value, to provide different warnings to a user of the system.

Various embodiments of the present disclosure offer one or more advantages. The present disclosure provides for an attitude display system for a remotely operated machine. It is expected that one of ordinary skill, notwithstanding possibly significant effort and many design choices motivated by, for example, available time, current technology and economic considerations, when guided by the concepts and principles disclosed herein, will be readily capable of generating such products with minimal experimentation.

In the foregoing specification, the disclosure and its benefits and advantages have been described with reference to specific embodiments. However, one of ordinary skill in the art would appreciate that various modifications and changes can be made without departing from the scope of the present disclosure, as set forth in the claims below. Accordingly, the specification and figures are to be regarded in an illustrative rather than a restrictive sense, and all such modifications are intended to be included within the scope of the present disclosure. The benefits, advantages, solutions to problems, and any element(s) that can cause any benefit, advantage or solution to occur or become more pronounced are not to be construed as critical, required or essential features or elements of any or all the claims. The disclosure is defined solely by the appended claims, including any amendments made during the pendency of this application, and all equivalents of those claims, as issued.

What is claimed is:

1. An attitude display system for a remotely operated machine, the display system comprising:
   a pitch display having a fixed pitch reference scale and a pitch indicator configured to move relative to the fixed pitch reference scale to indicate a pitch of the remotely operated machine, and a pitch text field to display a numerical value of the pitch;
   a roll display having a roll reference element and a roll indicator configured to pivot about a reference point to indicate a roll of the remotely operated machine, and a roll text field to display a numerical value of the roll; and
   wherein at least one of the pitch indicator and the roll indicator is configured to change color based on a degree of movement or pivot relative to a predefined threshold value to provide warning to a user of the system, and
   wherein the fixed pitch reference scale and the roll reference element are configured to maintain a relative position to one another regardless of the pitch and roll of the remotely operated machine.

2. An attitude display system for a remotely operated machine, the display system comprising:
   a pitch display having a fixed pitch reference scale that is vertically oriented and a horizontally oriented pitch indicator configured to vertically move relative to the fixed pitch reference scale to indicate a pitch of the remotely operated machine, and a pitch text field to display a numerical value of the pitch;
   a roll display having a roll reference element and a roll indicator configured to pivot about a reference point to indicate a roll of the remotely operated machine, and a roll text field to display a numerical value of the roll; and
   wherein at least one of the pitch indicator and the roll indicator is configured to change to a first color based on a degree of movement or pivot relative to a first predefined threshold value, and to change to a second color based on the degree of movement or pivot relative to a second greater predefined threshold value to provide different warnings to a user of the system, and
   wherein the fixed pitch reference scale and the roll reference element are configured to maintain a relative position to one another regardless of the pitch and roll of the remotely operated machine.

3. An attitude display system for a remotely operated machine, the display system comprising:
   a controller configured to receive signals indicating a pitch and a roll of a remotely operated machine, the controller configured to communicate signals to a pitch display and a roll display;
   the pitch display having a fixed pitch reference scale that is vertically oriented and a horizontally oriented pitch indicator configured to vertically move relative to the fixed pitch reference scale to indicate the pitch of the remotely operated machine, and a pitch text field to display a numerical value of the pitch;
   the roll display having a roll reference element and a roll indicator configured to pivot about a reference point to indicate the roll of the remotely operated machine, and a roll text field to display a numerical value of the roll; and
   wherein at least one of the pitch indicator and the roll indicator is configured to change color based on the degree of movement or pivot relative to a predefined threshold value to provide warning to a user of the system,
   wherein the fixed pitch reference scale and the roll reference element are configured to maintain a relative position to one another regardless of the pitch and the roll of the remotely operated machine, and
   wherein the pitch indicator and the roll indicator are configured to be in an overlaying configuration when within certain ranges of the pitch and the roll of the remotely operated machine, wherein the pitch indicator and the roll indicator have different configurations.

* * * * *